(12) United States Patent
Katayama et al.

(10) Patent No.: US 10,138,670 B2
(45) Date of Patent: Nov. 27, 2018

(54) LIFTING DEVICE AND VEHICLE DOOR WITH SAID LIFTING DEVICE

(71) Applicant: AISIN SEIKI KABUSHIKI KAISHA, Kariya-shi, Aichi (JP)

(72) Inventors: Hidefumi Katayama, Anjo (JP); Hirokazu Suzumura, Aichi-ken (JP); Shigeyuki Suzuki, Kariya (JP); Katsumi Chono, Hekinan (JP); Takayuki Ueno, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/318,824

(22) PCT Filed: Jun. 3, 2015

(86) PCT No.: PCT/JP2015/066045
§ 371 (c)(1),
(2) Date: Dec. 14, 2016

(87) PCT Pub. No.: WO2015/198815
PCT Pub. Date: Dec. 30, 2015

(65) Prior Publication Data
US 2017/0138110 A1   May 18, 2017

(30) Foreign Application Priority Data

Jun. 23, 2014 (JP) .................................. 2014-128238

(51) Int. Cl.
*E05F 15/689* (2015.01)
*B60J 5/04* (2006.01)
(Continued)

(52) U.S. Cl.
CPC .......... *E05F 15/689* (2015.01); *B60J 5/0416* (2013.01); *E05F 11/382* (2013.01); *E05F 11/488* (2013.01);
(Continued)

(58) Field of Classification Search
CPC ..... E05F 15/689; E05F 11/486; E05F 11/382; E05F 11/385; E05F 11/481; E05F 11/483; E05F 11/488; E05F 11/48
See application file for complete search history.

(56) References Cited

U.S. PATENT DOCUMENTS 6,088,965 A * 7/2000 Fukumoto ............. E05F 11/486
49/352
7,882,658 B2 * 2/2011 Staser .................... B60J 5/0416
49/352
(Continued)

FOREIGN PATENT DOCUMENTS

DE    102008058906 A1    5/2010
JP    6-239134 A         8/1994

OTHER PUBLICATIONS

International Search Report (PCT/ISA/210) dated Aug. 18, 2015, by the Japanese Patent Office as the International Searching Authority for International Application No. PCT/JP2015/066045.
(Continued)

*Primary Examiner* — Justin B Rephann
(74) *Attorney, Agent, or Firm* — Buchanan Ingersoll & Rooney PC (57) ABSTRACT

A lifting device lifting and lowering a window glass of a door, the lifting device including a drive mechanism for lifting and lowering the window glass, a support plate supporting the drive mechanism, and a carrier attached to the support plate in a slidable manner, and lifted and lowered by the drive mechanism, wherein the support plate includes a through hole, and a stopper which is provided at an inner (Continued)

panel of the door and stops of the carrier is inserted through the through hole.

7 Claims, 4 Drawing Sheets

(51) Int. Cl.
*E05F 11/38* (2006.01)
*E05F 11/48* (2006.01)

(52) U.S. Cl.
CPC ... *E05Y 2201/224* (2013.01); *E05Y 2800/748* (2013.01); *E05Y 2900/55* (2013.01)

(56) References Cited

U.S. PATENT DOCUMENTS

| | | | | |
|---|---|---|---|---|
| 7,950,185 | B2* | 5/2011 | Lefevre | E05F 11/486 49/349 |
| 8,127,495 | B2* | 3/2012 | Eckhardt | E05F 11/382 49/352 |
| 9,255,432 | B2* | 2/2016 | Imaoka | F16H 19/0618 |
| 2007/0144073 | A1* | 6/2007 | Munezane | E05F 11/483 49/349 |
| 2007/0214726 | A1* | 9/2007 | Graf | E05F 11/382 49/352 |
| 2010/0293858 | A1* | 11/2010 | Staser | E05F 11/486 49/349 |
| 2011/0232197 | A1 | 9/2011 | Suzuki et al. | |
| 2013/0152714 | A1* | 6/2013 | Imaoka | F16H 19/0618 74/37 |
| 2013/0160371 | A1* | 6/2013 | Hayotte | B60J 5/0416 49/352 |
| 2014/0007507 | A1* | 1/2014 | Umemura | E05F 11/481 49/349 |
| 2014/0190086 | A1* | 7/2014 | Yamamoto | E05F 11/385 49/452 |
| 2014/0298725 | A1* | 10/2014 | Imaoka | E05F 11/486 49/349 |

OTHER PUBLICATIONS

Written Opinion (PCT/ISA/237) dated Aug. 18, 2015, by the Japanese Patent Office as the International Searching Authority for International Application No. PCT/JP2015/066045.

English language translation of International Preliminary Report on Patentability (Form PCT/IB/373) and the Written Opinion of the International Searching Authority (Form PCT/ISA/237) dated Dec. 27, 2016, by the International Bureau of WIPO in corresponding International Application No. PCT/JP2015/066045. (4 pgs).

* cited by examiner

LIFTING DEVICE AND VEHICLE DOOR WITH SAID LIFTING DEVICE

TECHNICAL FIELD

This invention is related to a lifting device of a window glass, and a door for a vehicle which is provided with the lifting device.

BACKGROUND ART

A lifting device for lifting and lowering a window glass attached to a side door of a vehicle is described in Patent document 1, for example. The lifting device described in Patent document 1 includes a support plate supporting a drive mechanism for lifting and lowering the window glass, and a carrier slidably attached to the support plate. The window glass is attached to the carrier. The window glass moves up and down as the carrier is lifted and lowered.

The lifting device of this kind may include a stopper provided at a lower section of the support plate so that the window glass is prevented from moving downward beyond a predetermined position. In this configuration, a bottom dead center (a lower limit position) of the window glass in a moving range of the glass window is decided by an arrangement of the stopper.

DOCUMENT OF PRIOR ART

Patent Document

Patent document 1: German Patent application publication No. 102008058906

SUMMARY OF INVENTION

Problem to be Solved by Invention

A lifting device is configured in conformity with a door structure. For example, the lifting device is configured to include dimensions that can be accommodated within a side door. A guide rail of the lifting device is configured in conformity with a lifting and lowering direction of the window glass, the lifting and lowering direction which differs depending on a kind of the side door.

As described above, the lifting devices include different configurations from one another, depending on a kind of the side door. From a view point of production efficiency, it is desirable that components are commonized. However, it is difficult to commonize a support plate. When a group of side doors provided with window glasses of which sizes and/or the lifting-and-lowering directions are common or commonized with one another is defined as a door series, it seems easy to commonize the support plate in one door series. However, moving ranges of the window glasses may differ from each other even though the sizes and/or the lifting-and-lowering directions of the window glasses are identical to each other. A stopper is provided to the support plate in conformity with the moving range of the window glass, and therefore a different support plate needs to be prepared for each kind of the side door.

A purpose of this invention is to provide a lifting device and a vehicle door provided with the lifting device, which can be commonly applicable to doors included in a door series.

Means for Solving Problem

A lifting device for solving the above-described problem is a lifting device lifting and lowering a window glass of a door, the lifting device including a drive mechanism for lifting and lowering the window glass, a support plate supporting the drive mechanism, and a carrier attached to the support plate in a slidable manner, and lifted and lowered by the drive mechanism, wherein the support plate includes a through hole, and a stopper which is provided at an inner panel of the door and stops of the carrier is inserted through the through hole.

MODE FOR CARRYING OUT THE INVENTION

Figure 1:
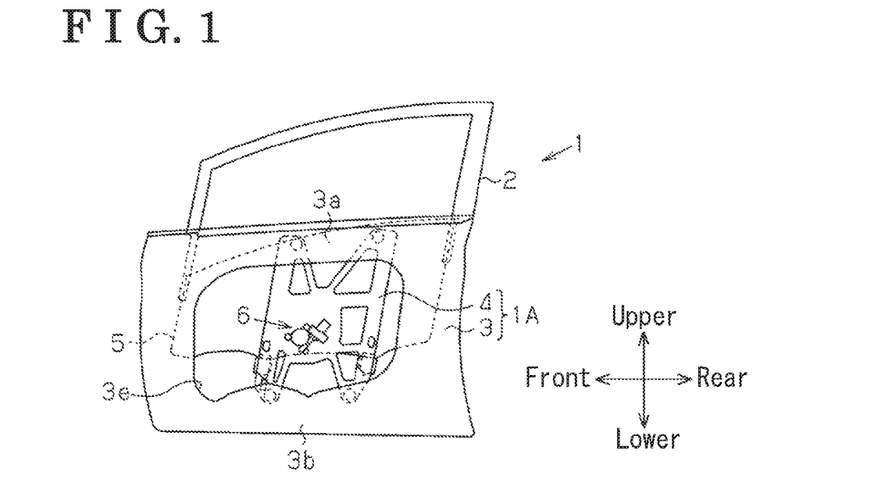
FIG. 1 is a schematic diagram of a side door, which is seen from an inner side.

A lifting device to be mounted on a side door of a vehicle will be described with reference to FIGS. 1 to 8B. As illustrated in FIG. 1, a side door 1 of a vehicle (a door for a vehicle) includes an outer panel 2 arranged at an outer side of the side door 1, an inner panel 3 arranged at an inner side of the side door 1, a lifting device 4 arranged between the outer panel 2 and the inner panel 3, and a window glass 5 lifted and lowered by the lifting device 4. The lifting device 4 includes a motor unit 6 for driving the lifting device 4.

An opening portion 3e for assembling of parts and components is provided at a central portion of the inner panel 3. The lifting device 4 is mounted on an outer surface of the inner panel 3. Specifically, an upper portion of the lifting device 4 is fastened to an upper portion 3a (a portion at an upper side relative to the opening portion 3e) of the inner panel 3 with a fastening member including a bolt. A lower portion of the lifting device 4 is fastened to a lower portion 3b (a portion at a lower side relative to the opening portion 3e) of the inner panel 3 with a fastening member including a bolt. A structural body including the inner panel 3 and the lifting device 4 corresponds to "a door structure 1A".

In the explanation from this point forward, "an inner surface" or "an inner side" of the lifting device 4 indicates "a surface" or "a side" arranged at the inner side in a state where the lifting device 4 is mounted on the side door 1 of the vehicle. "An outer surface" or "an outer side" of the lifting device 4 indicates "a surface" or "a side" arranged at the outer side in a state where the lifting device 4 is mounted on the side door 1 of the vehicle.

"A front side" of the lifting device 4 indicates "a side" arranged at a front side of the vehicle in a state where the lifting device 4 is mounted on the side door 1 of the vehicle. "A rear side" of the lifting device 4 corresponds to "a side" arranged at a rear side of the vehicle in a case where the lifting device 4 is mounted on the side door 1 of the vehicle.

"An upper side" or "the upper section" of the lifting device 4 indicates "a side" or "the section" arranged at the upper side in a state where the lifting device 4 is mounted on the side door 1 of the vehicle. "A lower side" or "the lower section" of the lifting device 4 indicates "a side" or "the section" arranged at the lower side in a state where the lifting device 4 is mounted on the side door 1 of the vehicle.

Figure 2:
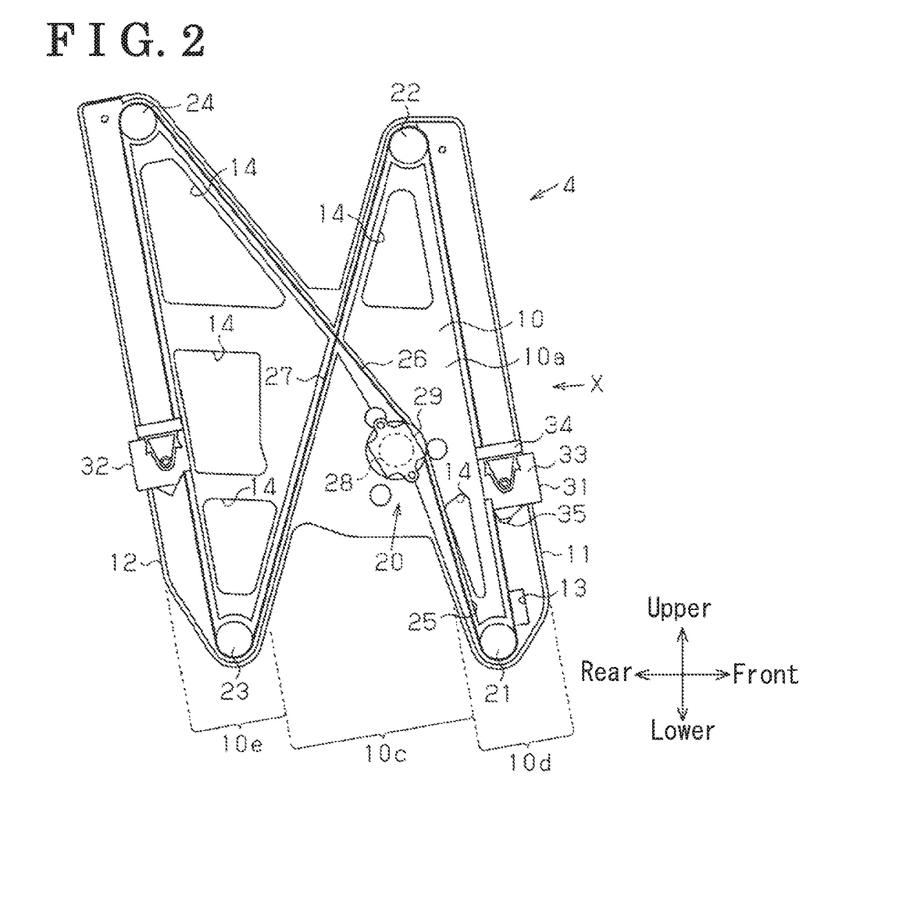
FIG. 2 is a schematic diagram of a lifting device to be mounted on the side door of FIG. 1, which is seen from an outer side.

As illustrated in FIG. 2, the lifting device 4 includes a drive mechanism 20 for lifting and lowering the window glass 5, a support plate 10 supporting the drive mechanism 20, and two carriers 31 and 32 each attached to the support plate 10 in a slidable manner and lifted and lowered by power of the drive mechanism 20. The carrier which is arranged at the front side of the lifting device 4 will be hereinafter referred to as "a first carrier 31" and the carrier which is arranged at the rear side of the lifting device 4 will be hereinafter referred to as "a second carrier 32".

Figure 3:
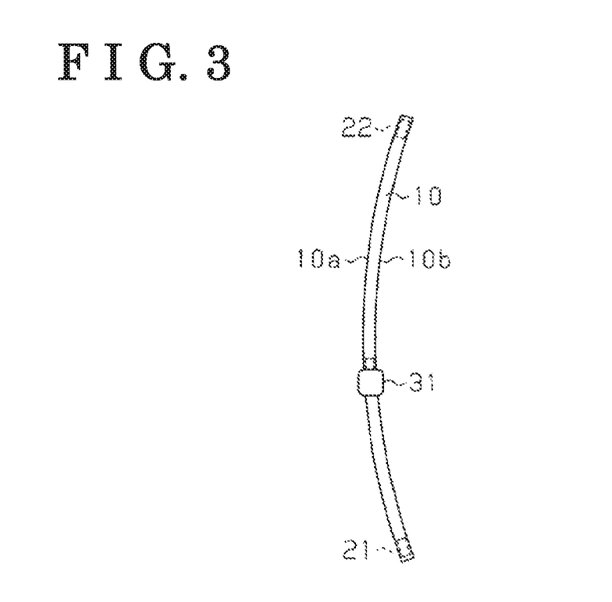
FIG. 3 is a schematic diagram of the lifting device of FIG. 2, which is seen from an X direction.

The support plate 10 is configured to follow the window glass 5. For example, in a case where the window glass 5 is curved to expand outward, the support plate 10 is configured to expand outward as illustrated in FIG. 3. That is, the support plate 10 is configured such that a gap between the window glass 5 and the support plate 10 is maintained constant while the curved window glass 5 is moving up and down. The support plate 10, which is described above, is made of resin, for example. The resin-made support plate 10 includes plural opening portions 14 to enhance formability.

The support plate 10 includes a front portion 10d arranged at the front side and extended in an upper and lower direction, a rear portion 10e arranged at the rear side and extended in the upper and lower direction, and a central portion 10c arranged between the front portion 10d and the rear portion 10e.

A first guide rail 11 guiding the first carrier 31 is provided at a front end of the support plate 10 (a front end of the front portion 10d) and a second guide rail 12 guiding the second carrier 32 is provided at a rear end of the support plate 10 (a rear end of the rear portion 10e).

The first and second guide rails 11 and 12 are formed to be integral with the support plate 10. The first and second guide rails 11 and 12 are parallel (or substantially parallel) to each other. Each of the first and second guide rails 11 and 12 is extended obliquely in conformity with a lifting and lowering direction of the window glass 5. The "oblique" indicates oblique relative to the vertical direction in a state where the lifting device 4 is mounted on the side door 1 of the vehicle.

The drive mechanism 20 is provided at an outer surface 10a of the support plate 10. The motor unit 6 for driving the drive mechanism 20 is arranged at an inner surface 10b of the support plate 10. The motor unit 6 includes a speed reducer and/or a gear mechanism. Power outputted from an output shaft (which will be hereinafter referred to as "a motor output shaft") of the speed reducer (or the gear mechanism) is transmitted to the drive mechanism 20. The motor output shaft is inserted through a through bore of the support plate 10 and protrudes from the outer surface 10a of the support plate 10.

The support plate 10 includes a through hole 13 formed at a region including a bottom dead center (a lower limit position) of the first carrier 31 in a moving range of the first carrier 31. The through hole 13 is for a stopper 3s (refer to FIG. 4), which will be described later, to be inserted through. The through hole 13 is formed in a rectangular shape (or in an elongated circular shape) and is extended along the first guide rail 11. A length of the through hole 13 in a long-side direction thereof, that is, a length along the first guide rail, will be described later.

The first carrier 31 and the second carrier 32 are configured as follows. The first carrier 31 is slidably attached to the first guide rail 11. The second carrier 32 is slidably attached to the first guide rail 12.

The first carrier 31 includes a carrier bracket 33 attached to the first guide rail 11, a holder 34 attached to the carrier bracket 33 and holding the window glass 5, and a contact portion 35 to be in contact with the stopper 3s. The contact portion 35 is formed by a buffer member made of resin or rubber. The second carrier 32 includes a configuration according to the first carrier 31 except that the contact portion 35 is not provided at the second carrier 32.

The drive mechanism 20 includes three pieces of cable (a first cable 25, a second cable 26, a third cable 27), a drum 28 pulling the first and second cables 25 and 26, and four pulleys (a first pulley 21, a second pulley 22, a third pulley 23, a fourth pulley 24) guiding the first to third cables 25 to 27.

The drum 28 is accommodated in an accommodation portion 29 arranged at a central portion of the support plate 10. The drum 28 is connected to the motor output shaft of the motor unit 6 and is rotated by drive of the motor unit 6.

The first to fourth pulleys 21 o 24 are rotatably attached to the support plate 10 as described below. The first pulley 21 is attached to a lower portion of the front portion 10d of the support plate 10. The second pulley 22 is attached to an upper portion of the front portion 10d of the support plate 10. The third pulley 23 is attached to a lower portion of the rear portion 10e of the support plate 10. The fourth pulley 24 is attached to an upper portion of the rear portion 10e of the support plate 10.

The first cable 25 connects a lower end portion of the first carrier 31 and the drum 28 to each other. Specifically, the first cable 25 includes a first end connected to the lower end portion of the first carrier 31. The first cable 25 extends from the first end thereof to the first pulley 21 arranged below. The first cable 25 is folded upward at the first pulley 21, and a second end of the first cable 25 is connected to the drum 28 arranged above the first pulley 21.

The second cable 26 connects an upper end portion of the second carrier 32 and the drum 28 to each other. Specifically, the second cable 26 includes a first end connected to the upper end portion of the second carrier 32. The second cable 26 extends from the first end thereof to the fourth pulley 24 arranged above. The second cable 26 is folded downward at the fourth pulley 24, and a second end of the second cable 26 is connected to the drum 28 arranged at the lower side relative to the fourth pulley 24.

The third cable 27 connects the first carrier 31 and the second carrier 32 to each other. Specifically, the third cable 27 includes a first end connected to an upper end portion of the first carrier 31. The third cable 27 extends from the first end thereof to the second pulley 22 above. The third cable 27 is folded downward at the second pulley 22 and is folded upward at the third pulley arranged at the lower side relative to the second pulley 22. A second end of the third cable 27 is connected to a lower end portion of the second carrier 32 arranged above the third pulley 23.

An operation of the drive mechanism 20 will be described. As the drum 28 rotates so as to wind the first cable 25 into the drum 28 (this rotational direction will be hereinafter referred to as "a first direction"), the first carrier 31 moves downward. As the first carrier 31 moves downward, the third cable 27 is pulled, and accordingly the second carrier 32 moves downward in association with the movement of the first carrier 31. That is, as the drum 28 rotates in the first direction, the first carrier 31 and the second carrier 32 move downward by the same distance.

As the drum 28 rotates so as to wind the second cable 26 into the drum 28 (this rotational direction will be hereinafter referred to as "a second direction"), the second carrier 32 moves upward. As the second carrier 32 moves upward, the third cable 27 is pulled, and accordingly the first carrier 31 moves upward in association with the movement of the second carrier 32. That is, as the drum 28 rotates in the second direction, the first carrier 31 and the second carrier 32 move upward by the same distance.

Next, a movement restriction mechanism restricting the first carrier 31 and the second carrier 32 from moving will be described. The downward movement of the first carrier 31 is restricted by the stopper 3s provided at the inner panel 3.

Figure 4:
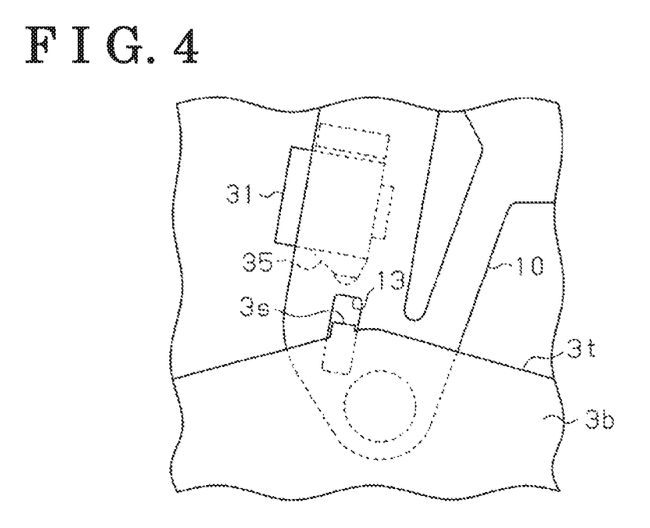
FIG. 4 is an enlarged view of a portion of the side door of FIG. 1, the portion at which a stopper is arranged.
Figure 5A:
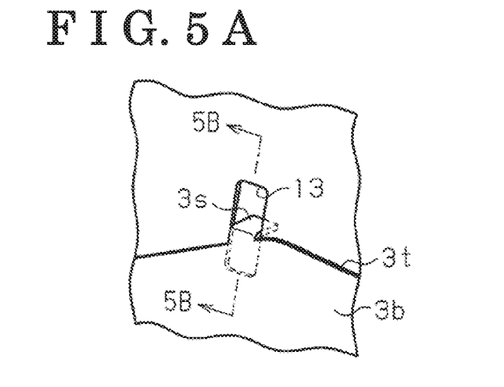
FIG. 5A is a perspective view of the stopper of FIG. 4.
Figure 5B:
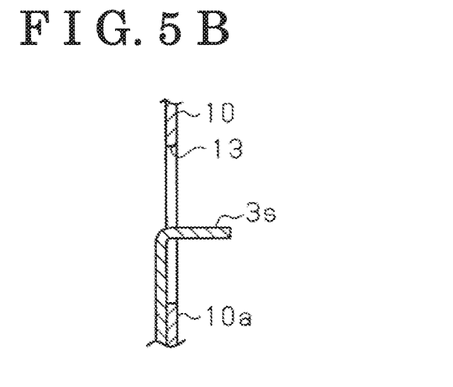
FIG. 5B is a cross-sectional view taken along line 5B-5B in FIG. 5A.

As illustrated in FIGS. 4, 5A and 5B, the stopper 3s protrudes from an upper end 3t of the lower portion 3b of the inner panel 3 towards the support plate 10. The stopper 3s is inserted through the through hole 13 of the support plate 10, protrudes from the outer surface 10a of the support plate 10, and is arranged to intersect with a moving direction of the first carrier 31. That is, the stopper 3s is arranged on a trajectory of movement the first carrier 31. The stopper 3s is arranged at the bottom dead center of the first carrier 31 in the moving range.

According to the above-described configuration, as the first carrier 31 moves downward and thus the contact portion 35 provided at the first carrier 31 comes to be in contact with the stopper 3s, the first carrier 31 is restricted from moving downward.

The lifting device 4 does not include a mechanism restricting the first carrier 31 from moving upward. This is because, when the window glass 5 moves upward and a window frame of the side door 1 is fully closed, the window glass 5 is restricted from moving upward. Accordingly, the first and second carriers 31 and 32 are restricted from moving upward. In a case where the first and second carriers 31 and 32 are restricted from moving upward, load torque applied to the motor unit 6 increases. On the basis of the increment in the load torque, a drive stop control of the motor unit 6 is performed.

Another example of the stopper 3s will be described with reference to FIGS. 6A and 6B. A stopper 103s is provided at the lower side relative to the upper end 3t of the lower portion 3b of the inner panel 3.

The stopper 103s is a cut-and-bent portion formed at the inner panel 3. For example, a slit corresponding to an outer shape of the stopper 103s is formed at the inner panel 3, and a portion which is left without being cut is folded and bent, and thus the stopper 103s is formed.

A position of the upper end 3t of the lower portion 3b of the inner panel 3 may be higher than the bottom dead center of the first carrier 31 because the inner panel 3 is long in the upper and lower direction. The stopper 103s described above is effective particularly in such a case.

Still another example of the stopper 3s will be described with reference to FIGS. 7A and 7B. A stopper 203s is configured as a different member which differs from the inner panel 3. The stopper 203s includes a fixing portion 203a to be fixed to the inner panel 3 and a restriction portion 203b with which the contact portion 35 of the first carrier 31 can be in contact. The restriction portion 203b is perpendicular to the fixing portion 203a. The fixing portion 203a includes a fastening hole 203c of an elongated circular. The inner panel 3 includes a through bore 3h. The stopper 203s and the inner panel 3 are fastened to each other by a bolt 210 and a nut 211. The bolt 201 is inserted through the fastening hole 203c of the stopper 203s and the through bore 3h of the inner panel 3, and then is screwed into the nut 211.

Because the fastening hole 203c of the stopper 203s includes the elongated circular shape, the stopper 203s is allowed to move relative to the inner panel 3. That is, when the stopper 203s and the inner panel 3 are fastened to each other, fine adjustment of a position of the stopper 203s along the long-side direction of the through hole 13 (in other words, along the moving direction of the first carrier 31) can be conducted.

Next, operations of the lifting device 4 and the door structure 1A including the lifting device 4 will be described. As described above, the support plate 10 of the lifting device 4 includes the through hole 13 through which the stopper 3s (103s, 203s) is inserted. The stopper 3 is not provided at the support plate 10 itself. Accordingly, the support plate 10 can be used commonly for the side doors 1 of the same kind. This aspect will be further described below.

The support plate 10 of the lifting device 4 is configured in conformity with the structure of the side door 1. For example, degree or level of curvature of the support plate 10 is configured to correspond to degree or level of curvature of the window glass 5. A size and/or a shape of the support plate 10 is determined according to a size of the side door 1 and/or other component built in the side door 1. The guide rails 11 and 12 are arranged obliquely to follow the lifting and lowering direction of the window glass 5. Consequently, the support plate 10 is made for each kind of the side door 1. Accordingly, the side door 1 includes significant varieties and thus complications in control increase, which brings decreased production efficiency. In addition, a metal die is needed exclusively for each of the types, which increases an initial cost. Consequently, the commonization of the support plate 10 is desired for the purpose of enhancement of the production efficiency.

The side door 1 includes a variety of modes or configurations. For example, the side door 1 may be classified depending on a configuration of the window glass 5 and/or a manner in which the window glass 5 is accommodated (for example, the lifting and lowering direction of the window glass 5). A group of the side doors 1 classified as described above is referred to as "a door series". It is possible that the common or commonized lifting device 4 is applied to each of the door series. However, moving ranges of the window glasses 5 of the side doors 1 included in one door series may not be identical to each other, which becomes a factor of hindering the commonization. The positions of the stoppers 3s need to be different from each other in accordance with the moving ranges of the respective window glasses 5. In the configuration in which the stopper is provided at the support plate, the support plate which corresponds to each of the side doors is needed in a case where the positions of the stoppers of the side doors included in one door series are slightly different from each other.

To solve the above-described problem, in this embodiment, the stopper 3s is not provided at the support plate 10 itself of the lifting device 4. Accordingly, the common lifting device 4 may be applied to all the doors included in one door series.

The length (the length along the first guide rail 11) of the through hole 13 provided at the support plate 10 is set at a predetermined dimension so that each of the stoppers 3s of all the side doors 1 included in one door series is insertable in the through hole 13. Specifically, the length and a size of the through hole 13 are set so that each of the stoppers 3s of all the doors belonging to one door series is insertable into the through hole 13 of the support plate 10.

In this embodiment, the stopper 3s is provided at the inner panel 3. The inner panel 3 is designed for each kind of the side doors 1, thus it is impossible to commonize the inner panels 3 of all the side doors 1 included in one door series. That is, in this embodiment, out of the door parts forming the door, a characteristic component (for example, the stopper 3s) of the door is provided at a door part (specifically, the inner panel 3) which cannot be commonized.

The stopper 3s (103s, 203s) is inserted through the through hole 13 of the support plate 10 of the lifting device 4 such that the stopper 3s (103s, 203s) can be in contact with the first carrier 31. The through hole 13 described above may bring a new problem to the support plate 10. This aspect will be described.

As described above, the support plate 10 is provided with the first and second guide rails 11 and 12 which respectively guide the first and second carriers 31 and 32 to lift and lower. The first and second carriers 31 and 32 are slidably attached to the first and second guide rails 11 and 12, respectively, and the drive mechanism 20 includes the first to third cables 25 to 27 for moving the first carrier 31 and the second carrier 32. The drive mechanism 20 may generate force which deforms the support plate 10. For example, in a case where the first and second carriers 31 and 32 are driven by the motor unit 6 and move downward, and accordingly the first carrier 31 is in contact with the stopper 3s, a large tensile force is applied to the first cable 25. The force is transmitted to the support plate 10 via the first pulley 21, and may deform the support plate 10. In a case where the force is excessively large, the first guide rail 11 may be distorted. In particular, in a case where the support plate 10 is thin, the support plate 10 may be curved and/or twisted in the vicinity of the through hole 13. Therefore, it is desirable that surroundings of the through hole 13 of the support plate 10 are reinforced.

Figure 8A:
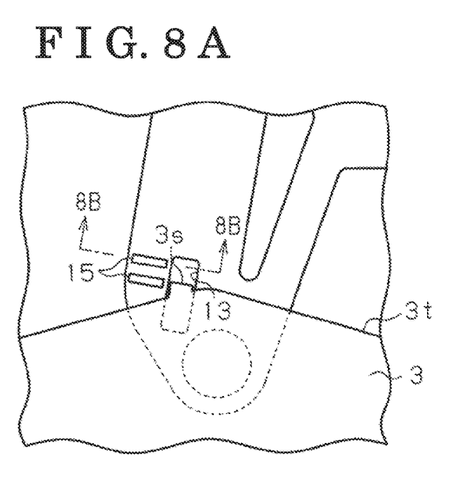
FIG. 8A is an enlarged partial view illustrating a modification example of the support plate of FIG. 4.
Figure 8B:
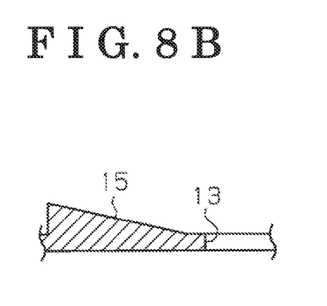
FIG. 8B is a cross-sectional view taken along line 8B-8B of FIG. 8A.

FIG. 8A and FIG. 8B illustrate an example of the support plate 10 provided with a rib 15. In this example, the rib 15 is extended from the through hole 13 in a direction towards the first guide rail 11 (which will be hereinafter referred to as "a lateral width direction"), between the through hole 13 and the first guide rail 11.

In the vicinity of the first pulley 21 of the support plate 10, the rib 15 restricts the support plate 10 from deforming in the lateral width direction. Accordingly, it is restricted that the through hole 13 is enlarged and/or a portion in the vicinity of the through hole 13 is twisted. Consequently, the first guide rail 11 is restricted from deforming.

As described above, the lifting device 4 and the side door 1 (the door for the vehicle) provided with the lifting device 4 which are related to this embodiment produce the following effects. (1) The support plate 10 of the lifting device 4 according to the aforementioned embodiment includes the through hole 13 in which the stopper 3s (103s, 203s) provided at the inner panel 3 is inserted.

According to the above-described configuration, the support plate 10 and the stopper 3s are different members from each other. The window glass 5 is restricted by the stopper 3s from moving downward. As the support plate 10 does not include the stopper 3s, the common support plate 10 is applicable to all the doors included in one door series. Consequently, the commonized lifting device 4 is applicable to all the side doors 1 belonging to one door series.

In a case where the stopper 3s is provided at the support plate 10, a force from the first carrier 31 towards the stopper 3s is applied to the stopper 3s when the first carrier 31 moves downward and then is in contact with the stopper 3s. The force is small enough relative to a bending strength of the support plate 10, however, the force elastically deforms the support plate 10. Such a deformation is generated every time the glass 5 is lifted and lowered, and therefore degradation of the support plate 10 may be progressed. According to this embodiment, the stopper 3s is not provided at the support plate 10, and thus the deformation of the support plate 10, which is due to that the first carrier 31 is stopped by the stopper 3s, is eliminated. Consequently, the deformation of the support plate 10 and/or the progress in the degradation of the support plate 10 can be restricted.

(2) At the lifting device 4 of the aforementioned embodiment, the rib 15 is desirably provided around the through hole 13 of the support plate 10. According to the above-described configuration, the support plate 10 is restricted from deforming because the surrounding portion of the through hole 13 is reinforced by the rib 15.

For example, the rib 15 is extended, between the through hole 13 and the first guide rail 11, from the through hole 13 in the direction towards the first guide rail 11 (the lateral width direction). According to the above-described configuration, the support plate 10 is restricted by the rib 15 from deforming in the lateral width direction, and thus it is restricted that the through hole 13 is enlarged and/or the portion near the through hole 13 is twisted.

(3) The side door 1 according to the aforementioned embodiment includes the lifting device 4 and the inner panel 3 supporting the lifting device 4. Each of all the side doors 1 in one door series includes the commonized lifting device 4, and productivity thereof is enhanced as a whole. Specifically, as the productivity of the lifting device 4 enhances, productivity of the side door 1 is enhanced.

(4) The inner panel 3 includes the lower portion 3b supporting a lower section of the support plate 10. The stopper 3s extends from the upper end 3t of the lower portion 3b of the inner panel 3 as illustrated in FIGS. 5A and 5B. According to the above-described configuration, the stopper 3s is provided easily in a manufacturing process of the inner panel 3.

Figure 6A:
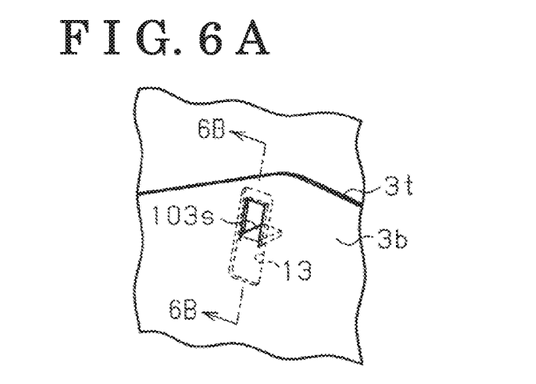
FIG. 6A is a perspective view of another example of the stopper.
Figure 6B:
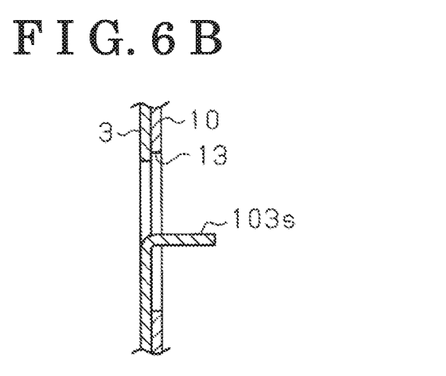
FIG. 6B is a cross-sectional view taken along line 6B-6B in FIG. 6A.

(5) In another example described above, the stopper 103s corresponds to the cut-and-bent portion formed at the inner panel 3 as illustrated in FIGS. 6A and 6B. According to the above-described configuration, the stopper 103s is provided easily in the manufacturing process of the inner panel 3. In the configuration, the stopper 103s can be provided at a position lower than the upper end 3t of the inner panel 3.

Figure 7A:
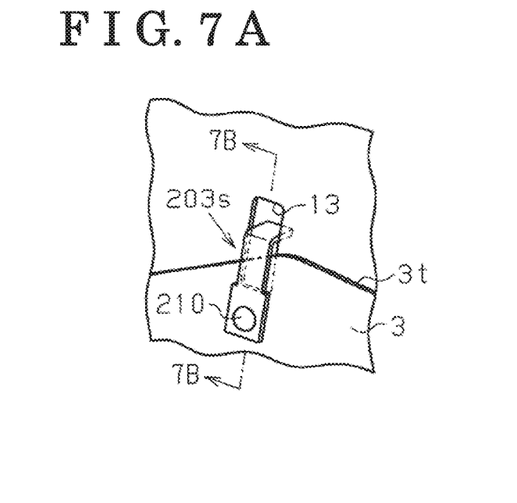
FIG. 7A is a perspective view of still another example of the stopper.
Figure 7B:
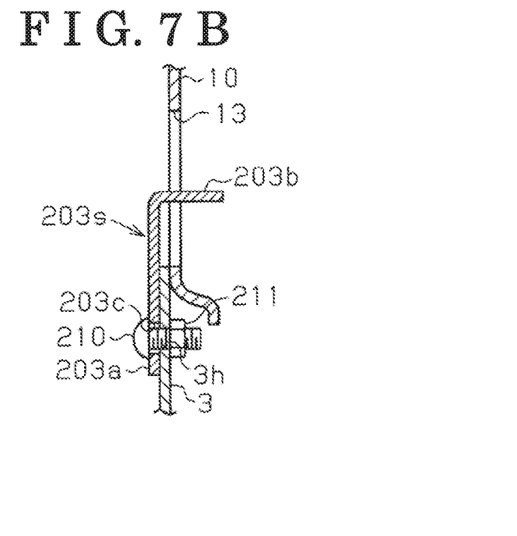
FIG. 7B is a cross-sectional view taken along line 7B-7B in FIG. 7A.

(6) In still another example, as illustrated in FIGS. 7A and 7B, the stopper 203s is the different member that is different from the inner panel 3 and is attached to the inner panel 3 in such a manner that the position of the stopper 203s is adjustable. According to the above-described configuration, the position of the stopper 203s can be adjusted.

The aforementioned embodiment may be changed as follows. In the aforementioned embodiment, the rib 15 reinforcing the vicinity of the through hole 13 of the support plate 10 is extended from the through hole 13 in the direction (the lateral width direction) towards the first guide rail 11, between the through hole 13 and the first guide rail 11. However, the arrangement and configuration of the rib 15 are not limited thereto.

For example, the rib 15 may be arranged to surround the through hole 13. Accordingly, the through hole 13 is restricted from deforming (that is, the deformation of the support plate 10 is restricted). In addition to the rib 15 described in the embodiment, a rib intersecting with the rib 15 may be provided. Accordingly, the support plate 10 is reinforced even more.

In the aforementioned embodiment, the support plate 10 is made of resin, however, material forming the support plate 10 is not limited. For example, the support plate 10 may be made from a metal plate, or a composite plate including a metal plate and a resin plate.

In the aforementioned embodiment, the first and second guide rails 11 and 12 are formed integrally with the support plate 10, however the first and second guide rails 11 and 12 may be different members that are different from the support plate 10. In the aforementioned embodiment, the lifting device 4 includes the two carriers 31 and 32, the number of carriers is not limited. For example, one carrier may move the window glass 5. In this case, the through hole 13 is provided at the support plate 10, in the vicinity of the bottom dead center of the carrier. Also in the above-described configuration, an effect according to the effect of the above-described (1) is obtained.

The invention claimed is:

1. A lifting device lifting and lowering a window glass of a door, the lifting device comprising:
    a drive mechanism for lifting and lowering the window glass;
    a support plate supporting the drive mechanism, said support plate mounted on a surface of an inner panel of the door; and
    a carrier attached to the support plate in a slidable manner, and lifted and lowered by the drive mechanism, wherein
    the support plate includes a through hole, and
    a stopper which protrudes from the surface of the inner panel of the door and stops movement of the carrier relative to the support plate is inserted through the through hole.

2. The lifting device according to claim 1, wherein the through hole is arranged proximate a lowermost position in a moving range of the carrier.

3. The lifting device according to claim 1, comprising:
    a rib provided adjacent the through hole.

4. A door for a vehicle, the door comprising:
    a lifting device lifting and lowering a window glass of a door; and
    an inner panel supporting the lifting device,
    the lifting device including:
        a drive mechanism for lifting and lowering the window glass;
        a support plate supporting the drive mechanism, said support plate mounted on a surface of the inner panel of the door; and
        a carrier attached to the support plate in a slidable manner, and lifted and lowered by the drive mechanism, wherein
        the support plate includes a through hole, and
        a stopper which protrudes from the surface of the inner panel of the door and stops movement of the carrier relative to the support plate is inserted through the through hole.

5. The door for the vehicle according to claim 4, wherein
    the inner panel includes a lower portion supporting a lower section of the support plate, and
    the stopper is extended from an upper end of the lower portion of the inner panel.

6. The door for the vehicle according to claim 4, wherein the stopper is formed from a portion of the inner panel that has been cut and bent.

7. The door for the vehicle according to claim 4, wherein the stopper is a separate member from the inner panel and the stopper is attached to the inner panel in such a manner that a position of the stopper is adjustable.

* * * * *